United States Patent [19]

Van As et al.

[11] Patent Number: 5,764,392
[45] Date of Patent: Jun. 9, 1998

[54] ACCESS CONTROL SYSTEM FOR A MULTI-CHANNEL TRANSMISSION RING

[75] Inventors: Harmen Roelof Van As; Hans Rudolf Schindler, both of Langnau, Switzerland

[73] Assignee: International Business Machines Corporation, Armonk, N.Y.

[21] Appl. No.: 624,388

[22] PCT Filed: Oct. 19, 1993

[86] PCT No.: PCT/EP93/02881
§ 371 Date: Apr. 5, 1996
§ 102(e) Date: Apr. 5, 1996

[87] PCT Pub. No.: WO95/11555
PCT Pub. Date: Apr. 27, 1995

[51] Int. Cl.⁶ .................................................. H04L 12/56
[52] U.S. Cl. ........................ 359/124; 370/460; 370/489
[58] Field of Search .............................. 359/118, 119, 359/123, 124; 370/459, 460, 480, 489, 496

[56] References Cited

U.S. PATENT DOCUMENTS 5,361,262  11/1994  Cheung ............................... 370/440
5,365,344  11/1994  Eda et al. ............................ 359/124
5,452,115   9/1995  Tomioka ............................. 359/123

FOREIGN PATENT DOCUMENTS 332197   9/1989  European Pat. Off. .
505658   9/1992  European Pat. Off. .
3603907  4/1987  Germany .

OTHER PUBLICATIONS

J.A. Davis et al., "A Local Network For Experiment Support," Proceedings of the National Electronics Conference, vol. 36, pp. 356–362, 1982.

*Primary Examiner*—Melvin Marcelo
*Attorney, Agent, or Firm*—John D. Flynn; P. M. Klett

[57] ABSTRACT

A node for an access control system for a multi-channel data transmission ring is disclosed. Access to a channel is controlled exclusively by one node, which is the only data receiving node connected to that channel. The receiving node generates slots so that other connected nodes can transfer data to the receiving node. The receiving node can provide balanced access to the channel by all connected nodes. Further embodiments feature prevention of congestion in the buffer of the receiving node. The invention is particularly useful for wavelength division multiplexed (WDM) optical rings.

19 Claims, 5 Drawing Sheets

ACCESS CONTROL SYSTEM FOR A MULTI-CHANNEL TRANSMISSION RING

The invention relates to an access control system for a multi-channel digital data transmission ring, especially for an optical ring with wavelength division multiplexing, in which a user or node is exclusively assigned as a data receiving user or node to each of the channels. In particular, the invention pertains to a node applicable in the described access control system.

BACKGROUND OF THE INVENTION

The technical field of the invention relates to communication networks for digital data transmission having a multi-channel ring topology. The networks referred to are known under the abbreviation LAN for Local Area Network, MAN for Metropolitan Area Network, and to a certain extent as WAN for Wide Area Network, respectively.

In a communication network, multiple users or nodes are interconnected by at least one transmission medium. In a ring topology, all node-to-node connections form together a circle through which the data are passed from a transmitting to a receiving node. Rings can be realized using transmission media like twisted pairs of wire, coaxial cables, or optical fibers. Several well known techniques can be employed to establish a multi-channel ring: The simplest approach is to use a number of parallel cables or fibers to interconnect the users of the ring. Another approach utilizes multiplexing techniques. In multiplexing, a common physical connection is shared between the users by dividing, for instance, the available bandwidth of of a transmitting medium into fractions exclusively accessible by one user, these fractions being either frequency fractions (frequency division multiplexing or FDM) or fractions of the complete bandwidth (time division multiplexing or TDM) referred to as time slots. The fraction of the total bandwidth is also referred to as logical channel in contrast to the physical "real" channel. While in electrical signal transmission the frequency multiplexing scheme is known as frequency division multiplexing, in optical networks the term wavelength division multiplexing (WDM) is preferred.

A WDM ring is described in the European patent application EP-A 0520494. From this application, a data transmission system is known, wherein each node is assigned to a wavelength different from other nodes, so, when it detects data on said wavelength, it receives said data for data processing, while data on other wavelengths are passed through. When the node transmits data to one of the other nodes, it generates data having the wavelength assigned to this destination node. Thus, every wavelength has the meaning of an address of the destination node. Further, to every node on the ring at least one time slot for each wavelength is assigned. Thus, the data transfer is strictly pre-coordinated or synchronized. While effectively preventing a collision of data transmitted to the channel, the fixed pre-coordination deteriorates the throughput of the channel, as transmitting users cannot take advantage of free time slots assigned to other nodes.

The method used in EP-A-0520494 and other methods allowing participation of multiple users in a network are generally known as medium access control (MAC) protocols. A MAC protocol serves to control the access of the users to the network, to direct the data from the sending or calling user to the receiving user, to prevent the loss of data, and the like. A major task of such a protocol is to guarantee a fair access of all users or nodes to the connecting network by predetermined criteria. These criteria may include the designation of priorities to certain nodes, the balance between heavy users of the network and occasional users, and managing access loads that exceed the maximum throughput of the network.

An approach (static FDM or TDM) in a MAC is to assign a portion of the transmission capacity to a certain user. However, static assignment is well known for its poor performance. Due to that reason, much work has been concentrated on dynamic bandwidth allocation methods. Two medium access schemes have won dominance in the art, one of which is based on random access Carrier Sense Multiple Access (CSMA) type protocols while the other scheme is characterized by controlled access token-passing type protocols.

Furthermore, a slotted transmission structure is known, for example, from a reservation based MAC protocol, i.e. the Cyclic Reservation Multiple Access (CRMA) protocol, which supports any combination of frame-oriented LAN and cell-oriented asynchronous transfer mode (ATM) data transmission. A CRMA protocol for bus topologies is described, for example, by M. M. Nassehi in: Eighth Annual EFOC/LAN Conference, Munich, June 1990, paper 5.3.4, pp. 246–251. In CRMA, one node, i.e. the headend or scheduler, issues continuously slots, identified by a start/end delimiter pair or by a characteristic header sequence. The transmitting nodes of the network transfer the data cells or frames into said slots, together with two address labels, indicating the source and the destination of the data. The CRMA protocol includes a reservation based fairness scheme to prevent that the first nodes of the network are occupying exclusively the slots.

It is an object of the invention to provide means to control the access of multiple users or nodes to a slotted transmission medium divided into different channels, wherein each node is assigned to one channel as receiving node. More specifically, the invention provides means for multiple access control ensuring fairness, data flow, and congestion control. A particular object of the invention is to provide such means for an optical ring using wavelength division multiplexing. These and further objects of the invention will become apparent from the following description of the invention.

SUMMARY OF THE INVENTION

According to the invention, a node in the described digital data transmission system comprises first means to transmit data to channels assigned to other nodes, second means to generate slots in which the other nodes can asynchronously insert the data to be transmitted to said node, said slots having at least one bit indicating a busy/free status which is set by the transmitting node, and third fairness control means to provide a balanced access to said slots to all nodes having data to transmit on said channel in case of the amount of data to be transmitted exceeds the capacity of said channel.

Thus, a node which controls a channel provides the slots into which the transmitting nodes insert the data designated to said node. As mentioned above, slots are identified by a start/end delimiter pair or by a characteristic header sequence. In contrast to the known access schemes for transmission media divided into channels controlled by different nodes, which only allow strictly synchronized data transmission in preassigned slots, as described in EP-A 0520494 the transmitting nodes according to the invention are allowed to transmit their data into any passing unoccupied slot, unless the capacity of the channel is exceeded. The status of a slot is indicated by an appropriate setting of the busy/free bit. The transmitting node sets the busy/free bit and, hence, prevents that other transmitting nodes try to gain access to the occupied slot. The asynchronous access exploits the capacity of a channel generally better than the strictly synchronized data transmission, in which the time slot assigned to one transmitting node cannot be occupied by another node.

In order to prevent an unbalance in access opportunities between the transmitting nodes for the generated slots in case that the amount of data to be transmitted is exceeding the capacity of the channel, each channel controlling node is provided with fairness control means, preferably comprising means to periodical generate a poll slot (reserve command). The time between two consecutive reserve commands or the number of slots generated between the two reserve commands is defined as reservation cycle.

The reserve command serves two purposes: Firstly, it notifies a fairness threshold value (TH) for the immediately following reservation cycle to the nodes which are currently tuned to its channel, i.e. the nodes which want to transmit data to the channel controlling destination node. Secondly, the reserve command gathers a value (QL) indicating the amount of data to be transmitted on the considered channel from each of the nodes tuned to that channel. The QL values are used to determine the threshold value (TH) for the next reserve command. If the demand does not exceed the capacity of the channel, the threshold value is set to a number, e.g. 0, indicating that the nodes are free to access as many of the passing unoccupied slots as required. If, however, the summed demand exceeds the capacity of the channel, the slots generated during the following cycle are marked as reserved by setting another bit, i.e. the reserve bit, within each slot. As a transmitting node, each node comprises further means to determine the amount of data allowed to be transmitted to another node according to the threshold value (TH) received by the node which controls the channel.

In another preferred embodiment of the invention, a node comprises a buffer, in which the data received from the medium can be stored. To prevent an overflow of the receiver buffer, flow control means monitor the extent to which the buffer is filled and throttle the generation of free slots, accordingly. The signal to throttle the free slot generation might as well be triggered from another circuitry the capacity of which being stressed critically. It is an advantage of the invention that the flow control on the transmission medium is achievable by simply marking part of the generated slots as busy, thus, preventing an access of transmitting nodes.

In addition to the flow control or instead of it, a node preferably comprises congestion control means, which also depends on the grade to which said buffer means is occupied and is using the channel as an intermediate storage. A possible way to exploit the transmission medium as an intermediate storage, according to the invention, is to let the channel controlling node generate a specific slot (congestion command) which causes all nodes to stop transmission on its channel. The incoming occupied slots are relayed back to the transmission medium. In case of an optical transmission medium, the slots are either reverted to the ring before the opto-electrical conversion by a switch controlled through the congestion control or by using the slot generator to reconstruct the received slots after opto-electrical conversion and feed these slots back to the ring by the same means as applied to freshly generated slots.

In many applications, specific priority schemes are required to control the access to the transmission medium according to different functions of the connected nodes, e.g. in real time applications like voice and video transmission. For example, in voice transmission, a node demands a guaranteed bandwidth to prevent a distortion or an interruption of the transmitted speech. To allocate a demand for guaranteed slots dynamically, i.e. according to the actual need, a node comprises priority access control means or guaranteed bandwidth control means periodically generating a poll slot (priority or guarantee command) to collect the demand for priority or guaranteed bandwidth slots to be transmitted on its channel node from each of the other nodes tuned to that channel. According to the number of requested priority or guaranteed slots and the capacity of its channel, the slot generator produces slots marked by special bits as priority or guaranteed slots. If both types of slots are requested, the guaranteed slots should preferably be generated before the priority slots. The nodes monitor the passing slots and occupy the first free priority or guaranteed slots with their data.

As in periods of high data traffic on a channel, almost every generated slot will be marked according to the invention as priority slot, as guaranteed, or as reserved, and as there is necessarily a delay of one round-trip between the reported demand and the generation of the respective slots, a node may have a reduced QL or even no data to transmit at the arrival of the slots demanded through the last polling. To maintain nevertheless a high throughput, the generated slots preferably have at least another bit (release bit) to cancel the effect of the reservation and free the unoccupied slot for the use by other nodes in case of an all optical transmission medium. The release bit is set by the data transmitting node. In case that the transmission medium is intermediately converted into the electrical domain, the transmitting node might simply erase the bits indicating a reservation or the like.

To synchronize the writing of bits or data into a slot, clocking must be provided by either extracting it from the data transmitted on each channel assuming that these data are scrambled or block coded, or by a common clocking channel. The common clocking channel is controlled by one (master) node having means for generating a clock signal. To increase the redundancy of the transmission system, several of the nodes might be equipped to control the clock channel. A common clock channel has the advantage that no specific coding or scrambling of the transmitted data is necessary and that, further, a node remains synchronized even when tuning to another channel.

Using the common clock channel as reference, it is possible to provide a node with means for bit, byte, or slot synchronization.

With an accurate synchronization, the network can be furnished with so-called isochronous slots in case that real time connections require a strict repetition of free slots for certain nodes by effecting a node to generate slots at fixed time intervals reserved for only one of the nodes transmitting data to its channel.

The invention is especially suitable for data transmission systems having an optical transmission medium divided into several channels by wavelength division multiplexing (WDM) as optical fibers are offering a large bandwidth for transmission.

DESCRIPTION OF THE DRAWINGS

The invention is described in detail below with reference to the following drawings.

DETAILED DESCRIPTION OF THE INVENTION

Figure 1A:
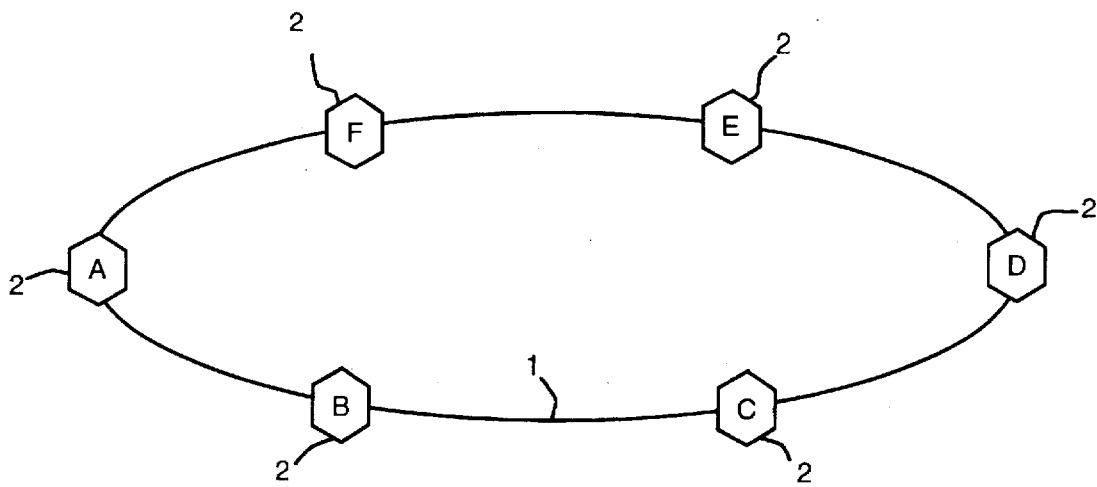
FIG. 1A shows an optical ring with several nodes.
Figure 1B:
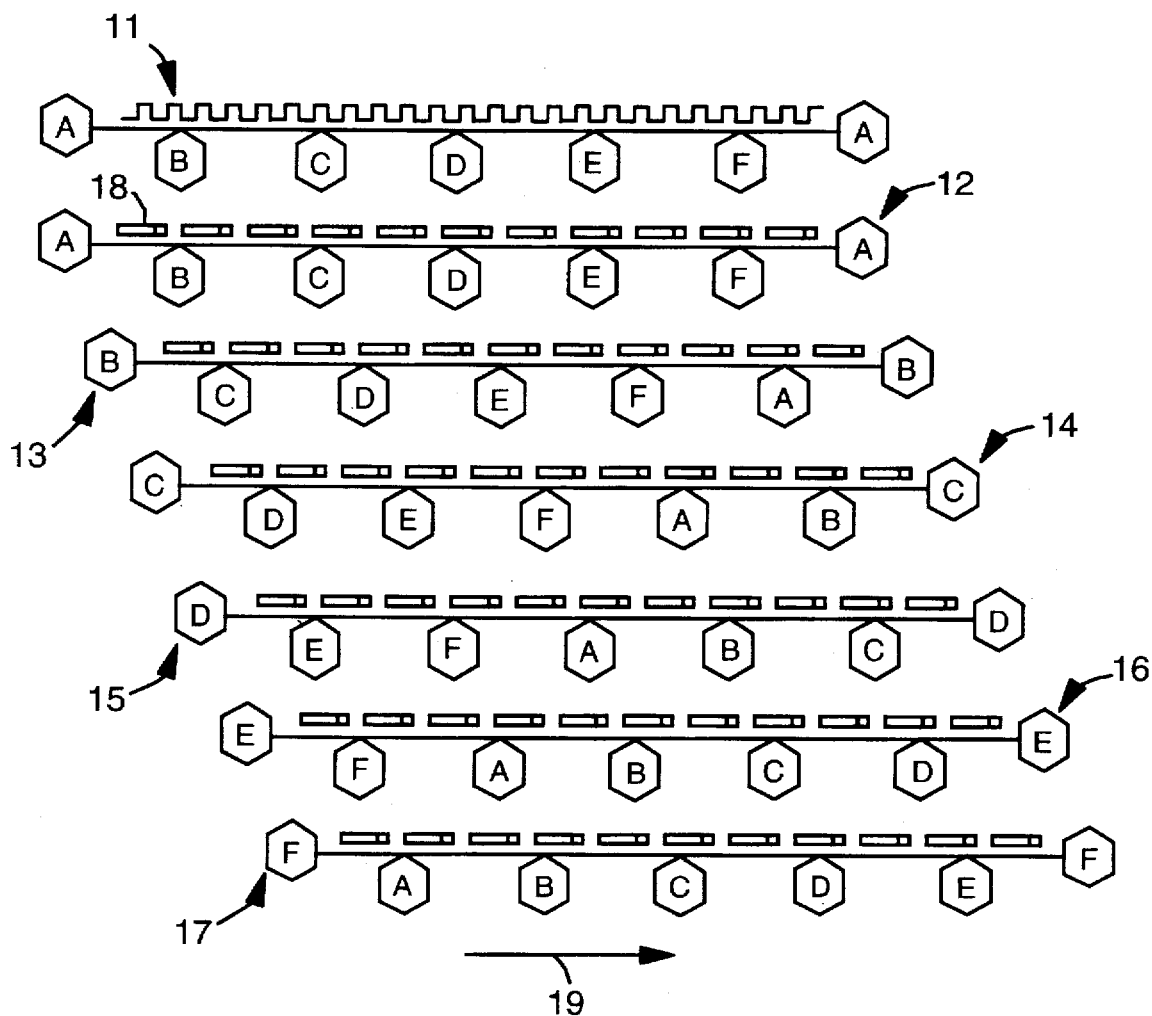
FIG. 1B illustrates schematically different channels as open loops of the ring of FIG. 1A using WDM.

A basic network structure is illustrated by FIGS. 1A and 1B. FIG. 1A shows a data transmission system based on an optical ring realized by a single optical fiber 1 with several nodes 2 labeled A . . . F. While FIG. 1A depicts a specific physical embodiment of the invention, FIG. 1B describing the multi-channel structure of the ring explains the basic idea of the invention in a more abstract and general way. The transmission medium, i.e. the optical fiber 1 of the described embodiment, is divided by wavelength division multiplexing (WDM) into a number of channels 11–17, which are shown in FIG. 1B. Each node is the only destination for data transmitted on its assigned channel. Though each channel is assigned exclusively to only one node, it is possible that one node controls more than one channel. In the described example, one of the nodes 2 labeled with A, the master node, drives two channels 11, 12, one (11) of which is used to provide a common clock signal to all nodes of the ring and for network management purposes, as will be explained below.

Simultaneously, the node is acting as headend of its channel. Thus, it generates free slots 18 and absorbs these slots again after a round-trip on the fiber 1, i.e. after they have passed the other nodes 2 of the transmission system. The direction of the data flow is indicated by arrow 19. In case of an optical ring, the invention establishes all-optical open loops, each starting and ending at a node A . . . F, as the headend is the only point at which a conversion of the optical data signals into electronic signals is performed.

Each node comprises a headend section which controls the channel assigned to it and a transmit section for communicating data to the other channels. Both parts of a node are schematically described by referring to FIG. 2. In case of a single-fiber ring, the complete optical signal of a wavelength channel assigned to the node is coupled out and an electrically regenerated signal is coupled back by the headend section 21 (enclosed by a dashed line). Between the two couplers 211, 212, the respective wavelength is suppressed. As optical couplers are readily available to a skilled person and not concern of this invention, no specific type is described. During the operation of the transmission system, the wavelength assigned to a node remains fixed. By using a tuneable coupler 211, it is possible to change the assignation during an initializing or a reconfiguration procedure. A tuneable coupler is for instance implemented by a a tuneable acousto-optical filter that is able to separate at least one selected wavelength channel from all WDM channels passing the node while suppressing the signals of the selected wavelength channel on the optical fiber 1, sufficiently.

In the preferred embodiment, the coupler is followed by means 213 for converting an optical signal into an electrical one, e.g. a photo diode or an array of photo diodes, and a receive buffer 214 storing the received data to prevent a loss of data in case that incoming data rate temporarily exceeds the rate in which the data are absorbed by the connected node.

As all slots are received by the headend, a slot generator 215 is provided to generate new slots. The electrically generated slots are converted into optical signals by an electro-optical converter 216. To implement tuneable electro-optical converter 216, a tuneable laser diode or an array of laser diodes each having a different wavelength is used. The coupler 212 feeds the slots into the optical fiber 1. It is important to note that all data assigned to other channels or wavelengths pass the headend without conversion.

Before explaining in detail the control means 217, 218, 219 which have an impact on the slot generator 215 of the headend 21, the transmit section 22 of the node will be described. The transmit section 22 of a node comprises a broadband coupler 221, a tunable wavelength filter 222 to select the wavelength at which a transmission is projected, and an opto-electrical converter 223 connected to means 224 for detecting the status of a passing slot of said channel and for synchronizing the data transmission to a free slot ensuring that the data are accurately written in the passing slot at the appropriate location, i.e. in the payload field of the slot. To store data in case that no free slots are immediately available on the channel, the transmit section 22 is additionally provided with a transmit buffer 225. Depending on the signal received from control 224, either the queue length (QL) as stored in register 226 or the data stored in the transmit buffer 225 are transmitted via the tuneable electro-optical converter 227, which comprises either a tuneable laser diode or an array of laser diodes with different wavelengths. The optical signal is coupled into the ring 1 by a coupler 228. A delay line 20 within the optical fiber 1 between the receiving coupler 211 and the transmitting coupler 212 of the headend section 21 compensates for the electronic or optical processing delay in the control path, thus allowing writing at the accurate position of the slot detected by the control means 224.

As mentioned above, it is an important aspect of the invention that the headend part of each node exclusively controls the data flow on its channel by generating slots to which all other nodes can contribute data signals, i.e. payloads, having said node as destination.

Besides the slot generation, each headend preferably comprises further means 217, 218, 219 to control the access to its channel. The fairness control 217 guarantees that all nodes tuned to the channel obtain an equal share of the channel throughput capability. The flow control 218 regulates the data flow such that the receiver can always accept all the data transmitted. And the congestion control 219 prevents data units from being lost due to a completely filled receive buffer. The described example of the invention achieves these controls by using four bits to indicate the status of a slot.

A busy bit indicates that the slot cannot be accessed by a node for transmitting data. A reserve bit is used to mark a slot as reserved in connection with the fairness control. And a guarantee bit is set to indicate a priority reservation. In addition, it can be used together with the aforementioned reserve bit to identify a guaranteed bandwidth slot. A guaranteed bandwidth is required by real time applications, such as interactive voice and video transmission or remote process control. The fourth bit, i.e. the release bit, indicates that the reservation due to any of the three other bits is cancelled and, hence, the slot can be accessed by any node. The release bit gains importance in the transient phase wherein the demand for slots decreases after a period of excess demand; reserved or guaranteed slots which are not needed by the transmitting nodes become available to the other nodes on the ring. Apparently, only the busy and reserve bits are necessary for fairness, flow, and congestion control. The other two bits are used advantageously for specific and advanced purposes.

In the following, the fairness control will be described in detail. It is the scope of the fairness control to reduce the impact of the position of a node within the bus or ring topology. Without a fairness control the first node situated 'downstream' of the headend node of the considered channel has free access to every slot generated by the channel's headend effectively blocking the data transmission of all following nodes for the period it is transmitting. To establish a fairness control, the headend of the channel periodically issues a special slot, i.e. the reserve command. The periods are referred to as reservation cycles. Apart from short rings carrying less than around hundred slots simultaneously on the transmission medium, a reservation cycle is a few slot time units larger than the round-trip delay. The reserve command collects from each node currently tuned to the channel the amount of data. i.e. the queue length (QL), waiting for transmission on that channel.

Further, the entries to the reserve command must not be identified by addresses indicating the transmitting node. Only an additional flag is required to notify whether a node specifies its queue length for the first time or not. Before the headend issues the reserve command, it marks all empty entries by a zero and all entries used in the previous reserve command by a one. A node making an entry for the first time detects the first location in the reserve command marked by a zero and stores the position of said location. Further, the current value of QL is written at this location. The node continues to use the marked location in the reserve command until it ceases to transmit on the channel.

If the sum of the required slots as reflected by incoming queue lengths exceeds the transmission capacity during a reservation cycle, the fairness control 217 within the headend section 21 of a node determines a fairness threshold value (TH). Means for determining a threshold value within microseconds is described, for example, in the European application No. 93810215.9, now EP-A 0617372 having the title 'Apparatus for Determining the Optimal Value of a Control Parameter and Use of the Apparatus'. The method described in the aforementioned application is based on treating the demand QL for each node as piecewise linear function using the number of slots as independent variable. To accelerate the determination of the threshold, the second derivatives of these functions are summed rather than the values QL, themselves. Due to the simple structure of the functions, the second derivatives equal +1 at the position zero (slots) and −1 at the position QL (slots) and zero, elsewhere.

Figure 3:
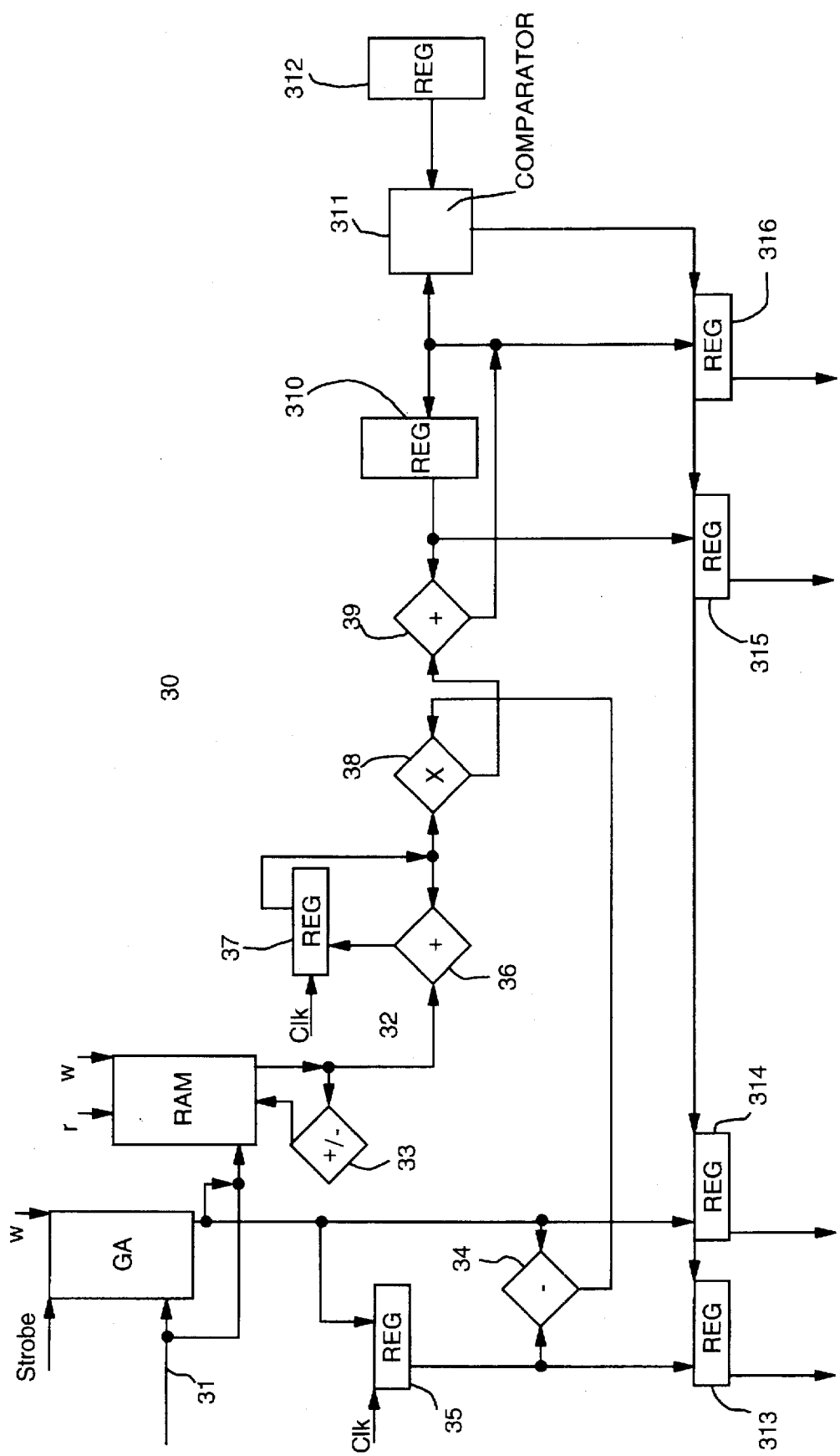
FIG. 3 shows means to determine a fairness threshold within a node.

To determine a threshold for the next reservation cycle, firstly, each node has means to determine the actual demand of a transmitting node taking into account that that node has transmitted data during the current reservation cycle after writing his demand to the currently received reserve command. The amount of data already transmitted either equals the amount of data QL(old) reported by each node in the previous cycle or the previous threshold value TH; this amount is subtracted from the demand of each node gathered from the current reserve command. Secondly, these differences, as representing the actual demand of each node for the considered channel, are sequentially supplied via the address line 31 to a gate array GA and a random access memory RAM as shown in FIG. 3.

For adding the second derivatives only the gate array GA, the RAM, and the incrementer/decrementer 33 of the whole circuit are active. The value zero and the actual demanded number of slots as calculated are applied via address lines 31 to the gate array GA and the random access memory RAM for each node, consecutively. In the described example, the input of the second derivative is done by the help of the incrementer/decrementer 33, as the slope of each function only changes by an amount of 1. The contents of the memory location in the RAM at the address zero is incremented by 1, whereas the value of the other memory locations at the addresses QL is decremented by 1 for request entries. During this summation process the gate array GA keeps track of all addresses at which an entry has been made. After the input from all nodes has been stored, accordingly, the cycle length values just above and below the desired cycle length, together with the corresponding threshold values are computed.

The gate array, when strobed, will consecutively output all the addresses at which a value had been entered. By means of a subtracter circuit 34 the difference between consecutive addresses is obtained.

The output from the gate array is also used to address the RAM. The RAM will output the sums of the second derivatives as stored at the addressed memory locations. This sum corresponds to a difference in the slope of the sum S of the requested slots. The differences in slope are integrated by means of an adder 36 and a register 37, resulting in the first derivative S* of S.

To perform the second integration these slope values S* are multiplied in the following circuit 38 with the value from the subtracter 34. This operation results in the difference between two consecutive values at upper and lower end of a linear segment of the sum S. By summing all these difference values with the help of another adder 39 and a register 310 all values of the function S itself are consecutively obtained.

As soon as the calculated cycle length value exceeds the desired cycle length reference value, stored in register 312, a load pulse stores the cycle length just above and just below the desired value in the registers 316 and 315, together with the corresponding threshold values, which are stored in registers 314 and 313. At this point, one of the two threshold values or a value derived by linear interpolation between the two values may be selected.

Since the multiplier is the slowest element in the chain, and since multipliers exhibit multiplication times of 50 ns or less, the threshold can easily be derived in less than 1 µs (assuming 16 active nodes).

The threshold value gives the maximum number of slots available to a node during the following reservation cycle. It is broadcast to the nodes together with the next reserve command. A corresponding number of slots in the reservation cycle are marked by the headend as reserved by setting the reserve bit to "1". If a threshold value other than zero is given, every transmitting node stores said value and writes its current queue length (QL) into the reserve command. A node is allowed to access free reserved slots up to either the threshold value or the QL value written in the preceding reserve command, whatever is less. For that purpose, the QL value as specified in the reserve command is stored by the node. The following components of the transmit section are used to handle the reserve command. The QL value, written to the new reserve command is stored in a first of two pipelined registers, while the old QL value written to the previous reserve command is pushed into the second register. A comparator compares the old QL value to the new TH value received from the new reserve command and controls a multiplexer which stores the minimum of either QL(old) or TH into a counter. This counter keeps track of the number of slots transmitted by the node within the current reservation cycle and terminates the transmission when the stored value is decremented to zero.

Assuming for example four nodes active on the considered channel with a demand of QL=10, 5, 12, and 3, respectively, the reserve command gathers a total demand of 30 exceeding a predetermined reference value, e.g. 25. The headend determines a threshold value of 9 resulting in a cycle length for the following reservation cycle of 26. The reserve command issued next reports the threshold value 9 to the control means 224 which regulate the data transmission of a node to the channel. The nodes, thus, occupy 9, 5, 9, and 3 slots of the next reservation cycle, respectively.

The reserve command which broadcast the TH of 9 to the nodes simultaneously collects a demand of QL=22, 7, 20, and 15 of the nodes for the next cycle. The headend determines the actual demand of the nodes for the next cycle by subtracting the slots transmitted during the current cycle.

The remaining demand becomes, therefore, 22–9, 7–5, 20–9, and 15—3, for the four nodes, giving a sum of 38. Thus, the next cycle starts with a threshold of 8 and, in accordance with the remaining demand of the nodes, a cycle length of 26 slots. If a node does not make use of the (full) amount of reserved slots, because it was able to transmit to a non-reserved slot in the meantime, the control 214 transmits a "1" to the release bit position of an unused slot, allowing other nodes to transmit data in these slots. The threshold determination is repeated until the capacity reference value is no longer exceeded by the accumulated demand of the nodes. In this case, the TH is set to a special value, e.g. 0, indicating that the access limitation is cancelled for the following cycle. To prevent a frequent change between periods of reserved and free access, it is proposed to define the capacity reference to a value below the 100% capacity of the system.

Figure 2:
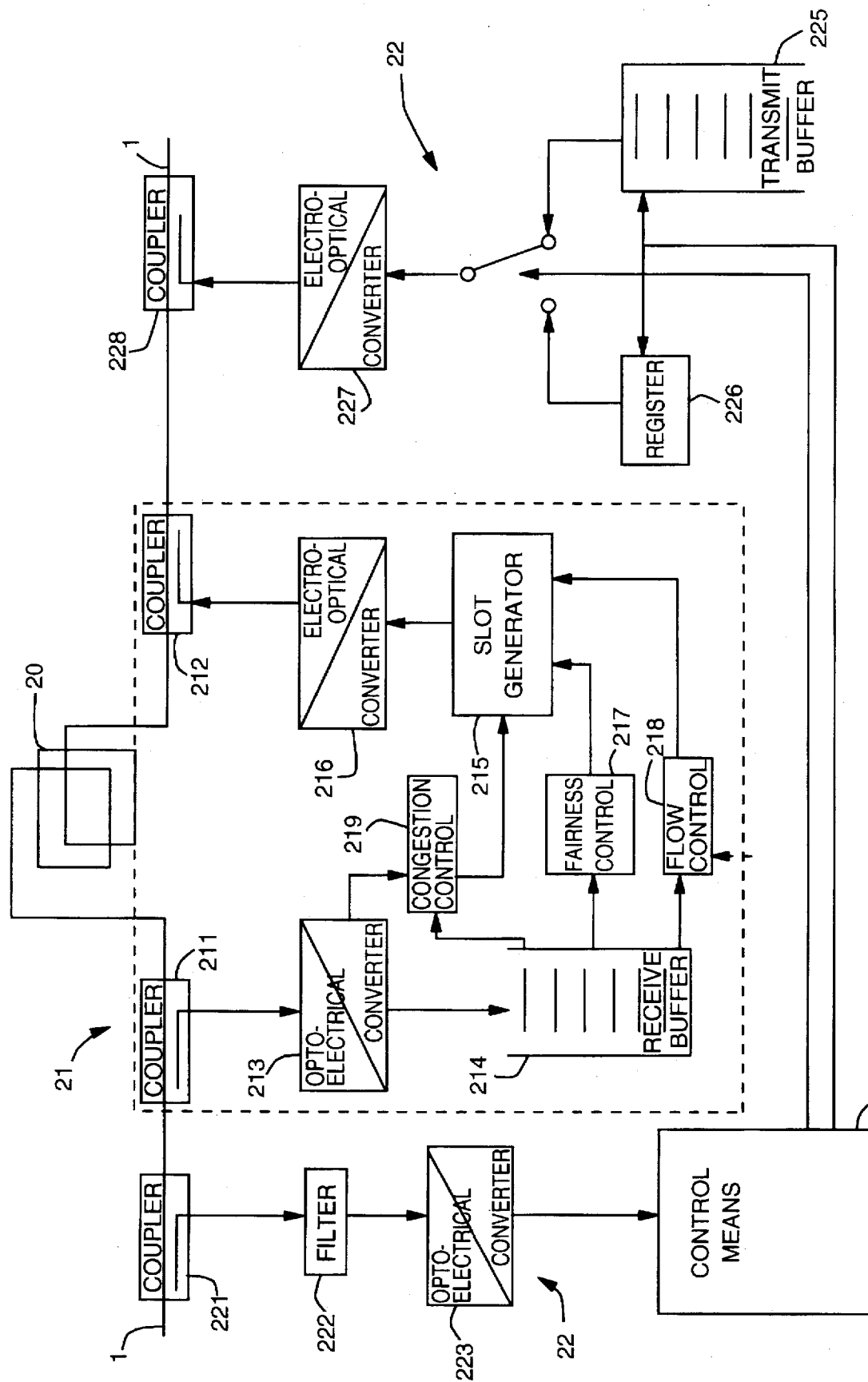
FIG. 2 shows the headend section and the transmit section of a node according to the invention.

In order to control the data flow, the headend 21 is able to mark a certain fraction of the generated slots as busy instead of free. As shown in FIG. 2, the flow control means 218 monitor the content of the receive buffer 214. When this content reaches a critical value, the slot generator 215 throttles the generation of free slots. This throttling does not disturb the data transmission to other destinations, because these transmission occur in different channels. Instead from the buffer 214, the flow control 218 may receive its input signal also from another circuitry when, for instance, the receiving node is an access point to a currently congested network, e.g. a bridge or a router.

A congestion control 219 prevents a loss of data due to an overflow of the receive buffer 214 in the headend. The congestion control causes the slot generator 215 to issue an special slot, i.e. the congestion command. The detection of a congestion command by the other nodes prevents them from transmitting further data, until the congestion command is rendered into a go-ahead command by the headend. The congestion command is issued by the headend when a busy slot arrives and the receive buffer is full. After the opto-electrical conversion 213, the busy slot and all following slot are no longer switched to the buffer 214 but redirected to the slot generator 215, which fills the freshly generated slots with the data of the received slot. Thus, the slots are relayed for another round-trip around the loop formed by the optical fiber 1. All other slots follow, independently of the buffer having gained free capacity in the meantime, until the congestion command returns to the headend. When it returns and the receive buffer has sufficiently been emptied, the command is converted into a go-ahead command, and the recycled busy slots are received, else they are forced to pass the ring, again. The slots remain in their correct sequence.

Figure 4:
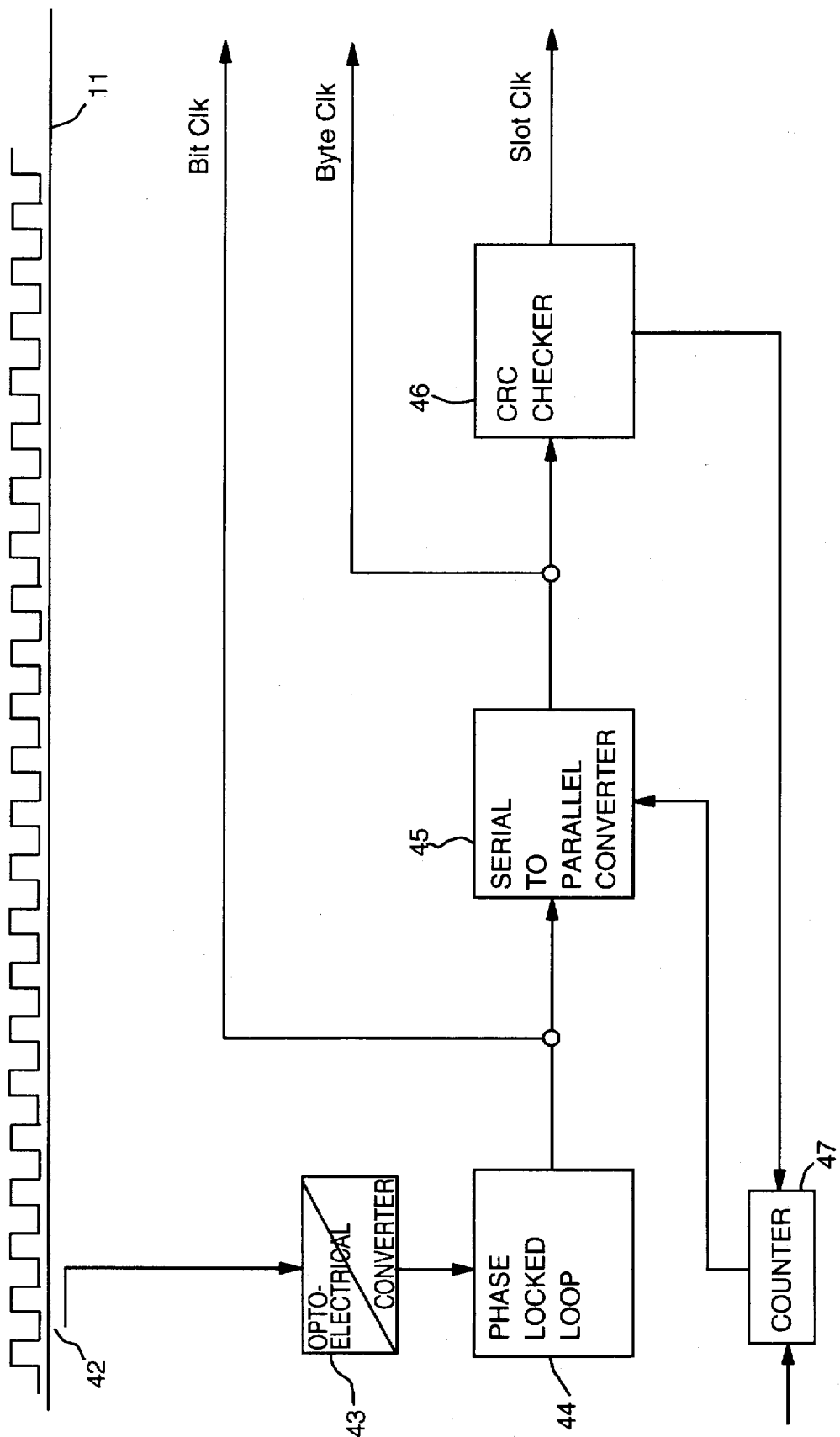
FIG. 4 shows a clock extraction circuitry of a node.

For the synchronization of the data transmission, the system preferably provided with a common clock channel controlled by the master node. In case of a WDM optical ring, a specific wavelength $\lambda_0$ is designated as clocking channel for all nodes. The common clock channel provides a bit, word, and slot synchronization, as shown in FIG. 4, as well as a timing frame, e.g. of 125 μs, for real-time applications. In addition, it can be used as service channel for network management. A coded diphase coding scheme can, for instance, be used to ease the clock extraction. From the clock channel 11 carrying the coded diphase clock signal, a part of said signal is coupled out via the coupler 42 and transduced into an electrical signal by the opto-electrical converter 43. By using a phase-locked loop 44, the bit clock is detected. A serial-to-parallel converter 45 converts the bit stream into an eight-bit wide format, while a CRC (Cyclic Redundancy Check) checker 46 keeps track of the slot boundaries. The CRC checker is also used to periodically reset a counter 47. If it is not reset, it produces a carry output which causes the serial-to-parallel converter 45 to skip a bit position. This process is repeated until the byte boundary is found.

Thus, a a bit clock, a word clock, and a slot boundary clock signal can be extracted and exploited for the transmission of the data to the ring. The common clock channel simplifies the receiver and transmitter of the nodes as no scrambler/discrambler or encoding/decoding hardware is required. Further, all transmitting channels are identically synchronized and, thus, every transmitter can tune to another channel without a resynchronization. Only a phase correction is needed, when changing the wavelength, since signals of different wavelengths propagate with different speeds.

The master node and the clock channel are used to allocate the wavelength channels to the nodes of the system, i.e. to tune the headend of a node to a certain wavelength at network initialization time or when a network reconfiguration is executed. Other network management tasks can be additionally performed by the master node. For example, it is possible to change the wavelength assigned to a node in a reconfiguration of the whole transmission system by sending control signals to the tuneable devices in the headend section of each node.

A particular write pattern is applied to the four status bits, i.e. the busy, release, reserve, and guarantee bit, ensuring that bits are erased (or nullified) only at the headend section. The headend generates in the described example five different types of slots: If none of the status bits is set (to "1"), the slot is a free slot. A "1" at the reserve bit position is used to indicate a free reserved slot, while an additional "1" at the guarantee bit position assigns a free guaranteed slot. If a "1" is set only at the guarantee bit position, a free priority slot is indicated. An isochronous channel slot can be defined by having a "1" at the busy and guarantee bit position. Whereas these bits are set by the headend which generates the slots, the transmitting node mark a used slot as busy by setting the busy bit. Further, a node can indicate that unused reserved, guaranteed, or priority slots are made free for being used by any node by setting the release bit to "1". These free released slots are marked busy by setting the busy bit. In the described scheme, bits are only set but not deleted (except at the receiving node) providing an advantage in optical signal processing where erasing a light signal on a particular wavelength channel from the transmission medium is more difficult to achieve than adding a light signal.

Figure 5:
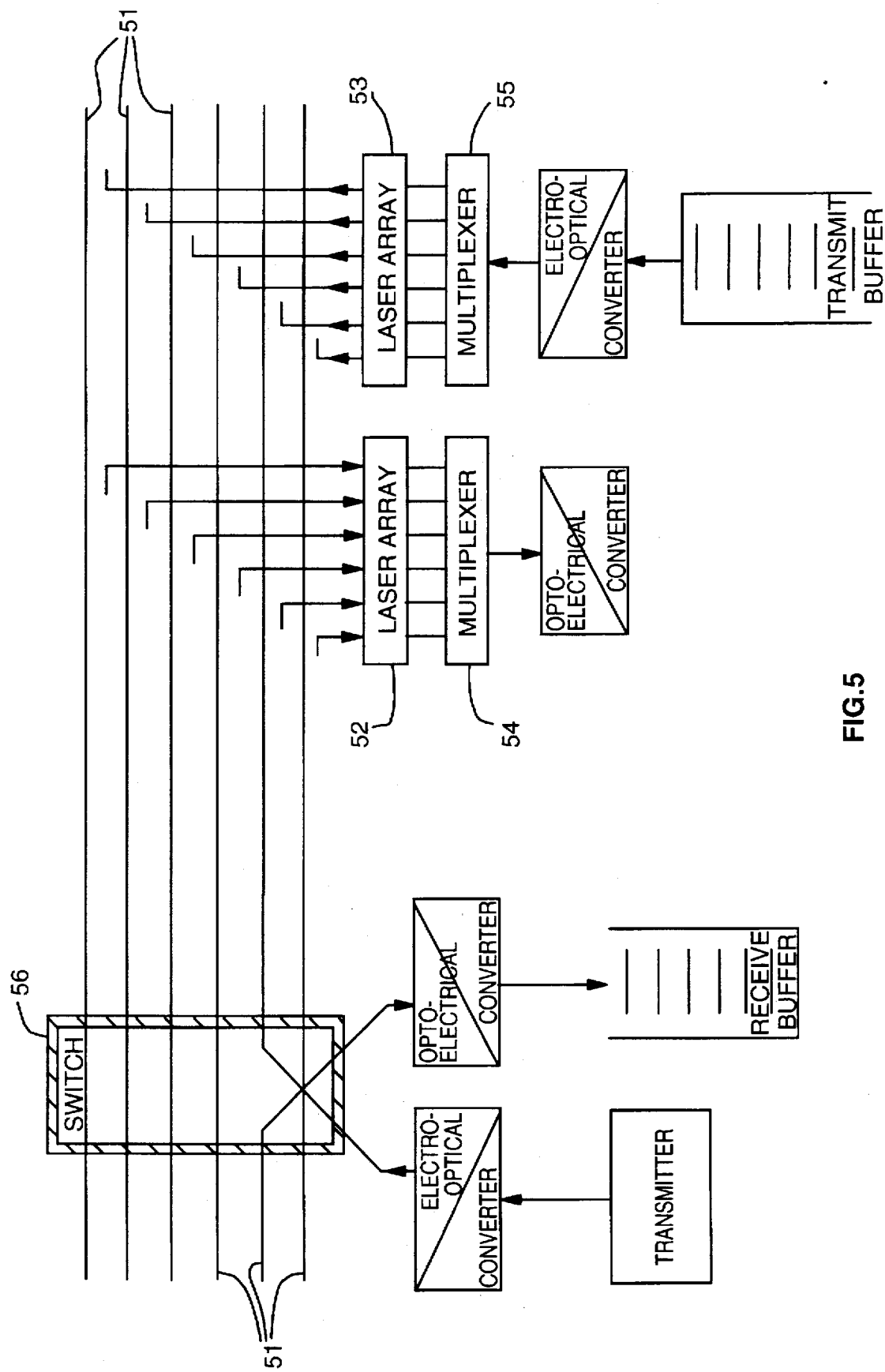
FIG. 5 shows components of a node according to the invention when using space division multiplexing for creating different channels.

FIG. 5 shows the another example of the invention wherein the multiple channels are realized by cables with parallel optical fibers 51. In this example, the headend section comprises an optical switch 56 operated either manually or electronically in case that the network is reconfigured. In the transmit section, the tunable filters and transmitting lasers are replaced by detector and laser arrays 52, 53 controlled by electronic multiplexing means 54, 55. By implementing these changes, the medium access control scheme of the invention remains basically unchanged.

What is claimed is:

1. A digital data transmission system comprising:
   a plurality of nodes;
   a transmission medium dividable into a plurality of channels connecting said nodes, with each of said nodes assigned to at least one of said channels for receiving data from the other nodes, each node further comprising:
   a coupling means to transmit data on channels assigned to other nodes;
   a slot generating means for generating slots on the channel assigned to the node for receiving data which has been asynchronously inserted into the assigned channel by the other nodes, said slot generating means able to mark generated slots as reserved;
   a fairness control means for controlling said slot generator means to provide balanced access to said slots on said assigned channel for the other nodes, said fairness control means determining the amount of data to be transmitted to the node and causing said slot generator means to mark one or more generated slots as reserved; and,
   a transmission control means for detecting a reserved slot on any one of the plurality of channels and for controlling said coupling means to prevent insertion of data to a reserved slot.

2. The digital data transmission system in accordance with claim 1, wherein the fairness control means comprises:
   a first means for controlling the slot generating means as to periodically generate a reserve command which broadcasts the threshold value (TH) for its assigned channel to the other nodes and gathers a value (QL) indicating the amount of data waiting to be transmitted on its assigned channel from each of the other nodes;
   a second means for determining a threshold value (TH) for the next reserve command, and, wherein the transmission control means comprises means for determining the amount of data to be transmitted to another node according to said threshold value (TH) sent by said other node in said reserve command associated with the assigned channel for said other node.

3. The digital data transmission system in accordance with claim 1, having at least one node further comprising:
   a buffer means for storing the data received from the transmission medium; and,
   a flow control means for controlling the slot generating means in accordance with the extent to which said buffer means is occupied.

4. The digital data transmission system in accordance with claim 1, having at least one node further comprising:
   a buffer means for storing the received data; and,
   a congestion control means for controlling the slot generating means in accordance with the extent to which said buffer means is occupied and using the assigned channel as intermediate storage when said buffer means is full.

5. The digital data transmission system in accordance with claim 1, having at least one node further comprising:
   a buffer means for storing the received data; and
   a congestion control means for controlling the slot generating means in accordance with the extent to which said buffer means is occupied and using the channel as intermediate storage, wherein said congestion control means comprises means for controlling the slot generating means to generate a congestion command for causing all other nodes to stop insertion of data on its assigned channel and means for relaying data received from its assigned channel back to the transmission medium.

6. The digital data transmission system in accordance with 1, having at least one node further comprising:
   a priority access control means or guaranteed bandwidth control means for controlling the slot generating means to periodically generate a poll slot collecting the demand for priority or guaranteed bandwidth slots on its assigned channel from each of the other nodes and to generate slots marked with a priority or guaranteed status, depending on the number of demanded priority or guaranteed slots and the capacity of its assigned channel.

7. The digital data transmission system in accordance with claim 1, having at least one node wherein the transmission control means further comprises means for marking a reserved slot as released.

8. The digital data transmission system in accordance with claim 1, having master node further comprising:
   a means for generating a clock signal on a common clock channel.

9. The digital data transmission system in accordance with claim 8, each node further comprising:
   a means for bit synchronization, byte synchronization, or slot synchronization, using the clock signal from the common clock channel as reference.

10. The digital data transmission system in accordance with claim 1, 2, 3, 4, 5, 6, 7, 8, or 9 wherein the transmission medium is an optical transmission medium divided into the plurality of channels by wavelength multiplexing division (WDM).

11. A node adapted for use in a digital data transmission system having a plurality of nodes and a transmission medium dividable into a plurality of channels connecting said nodes, with each of said nodes exclusively assigned to at least one of said channels as a data receiving node, said node comprising:
   a coupling means to transmit data on a plurality channels;
   a slot generating means able to generate slots on a first channel exclusively assigned to the node for receiving data which has been asynchronously inserted into the first channel, said slot generating means able to mark generated slots as reserved;
   a fairness control means for controlling said slot generator means to provide balanced access to said slots on said first channel by determining the amount of data to be transmitted to the node and causing said slot generator means to mark one or more generated slots as reserved; and,
   a transmission control means for detecting a reserved slot on any one of the plurality of channels and for controlling said coupling means to prevent insertion of data to a reserved slot.

12. The node in accordance with claim 11 wherein the fairness control means further comprises:

a first means for controlling the slot generating means to periodically generate a reserve command in a poll slot which broadcasts a threshold value (TH) for the assigned channel and gathers a value (QL) indicating the amount of data waiting to be transmitted to the node on the assigned channel;

a second means for determining a threshold value (TH) for the next reserve command, and, wherein the transmission control means comprises means for determining the amount of data to be transmitted from the node according to a received threshold value received by the node in a reserve command from a poll slot in another channel.

13. The node in accordance with claim 11, comprising:

a buffer means for storing the data received from the transmission medium; and, a flow control means for controlling the slot generating means in accordance with the extent to which said buffer means is occupied.

14. The node in accordance with claim 11, comprising:

a buffer means for storing the received data; and, a congestion control means for controlling the slot generating means in accordance with the extent to which said buffer means is occupied and using the assigned channel as intermediate storage when said buffer means is full.

15. The node in accordance with claim 11, comprising:

a buffer means for storing the received data; and a congestion control means for controlling the slot generating means in accordance with the extent to which said buffer means is occupied and using the channel as intermediate storage, wherein said congestion control means comprises means for controlling the slot generating means to generate a congestion command for halting the insertion of data on the assigned channel and means for relaying data received from the assigned channel back to the assigned channel.

16. The node in accordance with 11 comprising:

a priority access control means or guaranteed bandwidth control means for controlling the slot generating means to periodically generate a poll slot for collecting the demand for priority or guaranteed bandwidth slots for the assigned channel and to generate slots marked with a priority or guaranteed status, depending on the demand for priority or guaranteed slots and the capacity of the assigned channel.

17. The node in accordance with claim 11 wherein the transmission control means comprises means for marking a reserved slot as released.

18. The node in accordance with claim 11 further comprising:

a means for generating a clock signal on a clock channel.

19. The node in accordance with claim 11, further comprising:

a means for bit synchronization, byte synchronization, or slot synchronization, using a clock signal from a clock channel as reference.

* * * * *